United States Patent [19]

Osawa

[11] Patent Number: 4,941,758
[45] Date of Patent: Jul. 17, 1990

[54] LINEAR SLIDING GUIDE BEARING

[75] Inventor: Nobuyuki Osawa, Takasaki, Japan

[73] Assignee: Nippon Seiko Kabushiki Kaisha, Tokyo, Japan

[21] Appl. No.: 378,134

[22] Filed: Jul. 11, 1989

[30] Foreign Application Priority Data

Jul. 29, 1988 [JP] Japan ............................ 63-100856[U]

[51] Int. Cl.$^5$ ............................................. F16C 29/12
[52] U.S. Cl. ........................................ 384/40; 384/42; 384/912
[58] Field of Search .................. 384/40, 42, 39, 43, 384/49, 912

[56] References Cited

U.S. PATENT DOCUMENTS 4,518,205   5/1985   Heathe ................................. 384/40
4,773,769   9/1988   Church ................................. 384/42

FOREIGN PATENT DOCUMENTS 47-43838   12/1972   Japan .
52-12843    3/1977   Japan .
59-58215    4/1984   Japan .

Primary Examiner—Lenard A. Footland
Attorney, Agent, or Firm—Basile and Hanlon

[57] ABSTRACT

A sliding member made of a thin plastic plate is bonded to the inner surfaces of an upper plate portion and both side wall portions of a slider which is slidably mounted on the guide rail. A slit is formed in at least one of the side walls of the slider and extends vertically from the bottom surface of the side wall to reach an upper base portion of the side wall, and also extends axially in parallel to the outer side surface of the side wall. A pressing bolt is engaged with a threaded screw hole formed laterally at an intermediate position of the overall length of the side wall to reach the slit and to press the slit surface of the slit inwardly to elastically deform the inner part of the side wall to thereby adjust the gap between the sliding member and the guide rail.

3 Claims, 2 Drawing Sheets

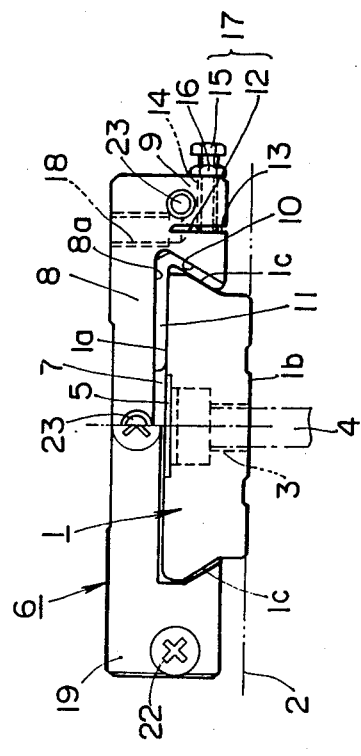
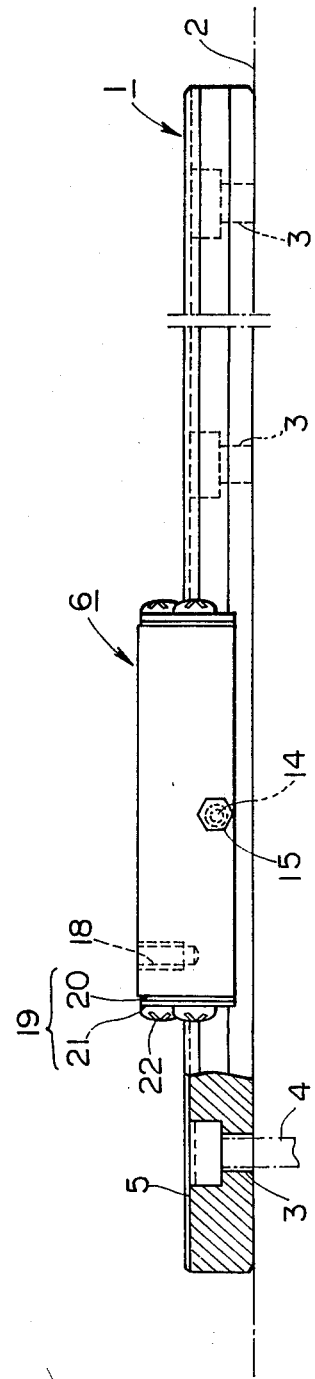
FIG.1
FIG.2

LINEAR SLIDING GUIDE BEARING

BACKGROUND OF THE INVENTION

1. Field of the Invention

The present invention relates to a linear sliding guide bearing, and in particular, to an improvement therein.

2. Description of the Related Art

Various prior art linear sliding guide bearings have been known. For example, Japanese Patent Laid-Open Publication No. 47-43838 discloses a linear sliding guide bearing in which a dovetail slot is formed in a metallic guide rail. A sliding member made of an elastic plastic and having a guide face formed in a slightly convex shape is mounted in the dovetail slot. A table (slider) is fixed to the sliding member with a bolt (first prior art example).

Furthermore, Japanese Utility Model Laid-Open Publication No. 59-58215 discloses a sliding unit including a guide rail formed by stamping a plate material and a table (slider) having a flat plate shape and slidably fitted in the guide rail. A base portion secured to a base, side wall portions bent upwardly from both edges of the base portion and opposing to each other sandwiching an axis line of the rail, sliding portions bent outwardly from upper ends of the side wall portions in parallel with the base portions, and holding portions bent downwardly from end portions of the sliding portions towards the base portions are integrally formed. The table is formed of a plate member having a sliding member integrally attached to a lower surface. A gib having a holding piece which is formed by stamping and fitted into a holding portion of the rail is provided integrally on the table. The gib of the table is slidingly in contact with the sliding portion and the holding portion of the rail, and the sliding portion and the holding portion are fitted so that they are held vertically (second prior art example).

Moreover, a catalog 85'-2, No. JC00-100, pages 2-31, of OILESS KOZYO K.K. discloses an oiless slide shifter in which a liner (sliding member) sliding on the upper surface of the guide rail, and a gib (sliding member) sliding on the side surfaces are both formed by an oiless metal (oleo-sintered alloy), and the slider and gib are fixed to the slider by a bolt (third prior art example).

Furthermore, Japanese Utility Model Publication No. 52-12843 discloses a mechanism in which a movable member is freely slidable with respect to a guide bar through a plurality of open type slide ball bearings along an axis line of the guide rail. In this mechanism, an elastic deformation portion formed with a dovetail slot is claimed to the movable member to thereby apply a pre-load to the slide ball bearings.

However, in the first prior art example, a head of a bolt for adjusting gaps between the table and the guide rail, and between the table and the sliding member faces an inner surface of the dovetail slot of the guide rail. As a result, in order to adjust the gaps, the table must be removed from the guide rail each time an adjustment is made. This is not a simple task and is troublesome. Furthermore, since the guide surface of the plastic sliding portion is formed in the convex shape, a problem results in that it is quickly worn which could cause rattling.

Furthermore, in the second prior art example, the guide rail and the flat-plate type table slidably fitted to the guide rail are merely formed by stamping a plate member and assembled each to each other. Accordingly, it is small and light weight. However, no means is provided for adjusting the gaps between the guide rail and the table. Thus, it has been impossible to adjust the gaps.

Moreover, in the third prior art example, the sliding member interposed between the guide rail and the slider is fixed by the bolt. As a result, it is difficult to make it small and thin. The adjustment of the gap between the guide rail and the slider is effected by pressing the sliding member having a weak strength by a bolt, and also by adjusting the degree of clamping of a fixing bolt which is engaged with a screw hole provided in the sliding member. For this reason, it is difficult to perform a fine adjustment of the gap. Further, there are holes for fixing bolts and recesses on the upper surface of the guide rail. Consequently, dust is apt to be deposited on the upper surface of the guide rail, and this poses a problem in that the lip portion of the wiper seal is held by the edge of the recesses so as to disturb the smooth operation of the slider.

SUMMARY OF THE INVENTION

The present invention was made to solve the aforementioned problems in the prior art, and it is an object of the invention to provde a linear sliding guide bearing which is small, lightweight, easy in adjusting the gaps, and excellent in dust proof property and operability of the slider.

In order to achieve the object, a linear sliding guide bearing in the present invention comprises an axially extending guide rail and a slider loosely and slidably fitted onto the guide rail. The guide table includes both sliding side surfaces slanting and expanding upwardly and outwardly from both edges of a bottom surface which is fixed to a base, and includes a plurality of fixing bolt holes penetrating from the upper surface to the bottom surface at predetermined intervals along the axis line. The slider includes both side walls whose inner surfaces slant inversely and opposed to the slanting sliding side surfaces of the guide rail with a gap therebetween. The slider also includes an upper plate portion having an inner surface opposed to the upper surface of the guide rail with a gap therebetween. A sliding member formed of a thin plastic plate is bonded to the inner surfaces of the upper plate portion and to both of the side walls to fill the gap therebetween. At least one of the side walls has a slit extending vertically from the bottom surface of the side wall to reach near an upper base portion of the inversely slanted inner surface. The slit also extends axially in parallel to the outer side surface of the side wall. Pressing means is provided to press a slit surface of the slit to deform elastically the inversely slanted inner surface of the side wall towards the sliding side surface of the guide rail.

A strip member may be bonded to the upper surface of the guide rail to cover the fixing bolt holes which open to the upper surface.

The linear sliding guide bearing is suitable for a unit for a robot when the guide rail and the slider are made of hard anodized aluminum treated aluminum alloy.

When the thin plastic plate is used as a sliding member, machining is easy since it is only required to cut and bend the plate. Thus the sliding member becomes smaller and lighter as compared with that made of an oleo-sintered alloy.

In adjusting the gap, the elastic deformation of the slider is utilized. As a result, the number of components is small and the structure is simple.

Since the guide rail fixing bolt holes can be covered by a metal tape which constitutes the strip member, the dust proof property and the slidability can be improved.

By making the guide rail and the slider of hard anodized aluminum treated aluminum alloy, it becomes very small in size, and the inertia of the moving part is reduced. Therefore, the response and service life can be improved.

BRIEF DESCRIPTION OF THE DRAWINGS

FIG. 1 is an axial front view of a linear sliding guide bearing of an embodiment of the invention with a right half of a wiper seal cut away;

FIG. 2 is a side view of the linear sliding guide bearing shown in FIG. 1; and

DESCRIPTION OF THE PREFERRED EMBODIMENT

Figure 3:
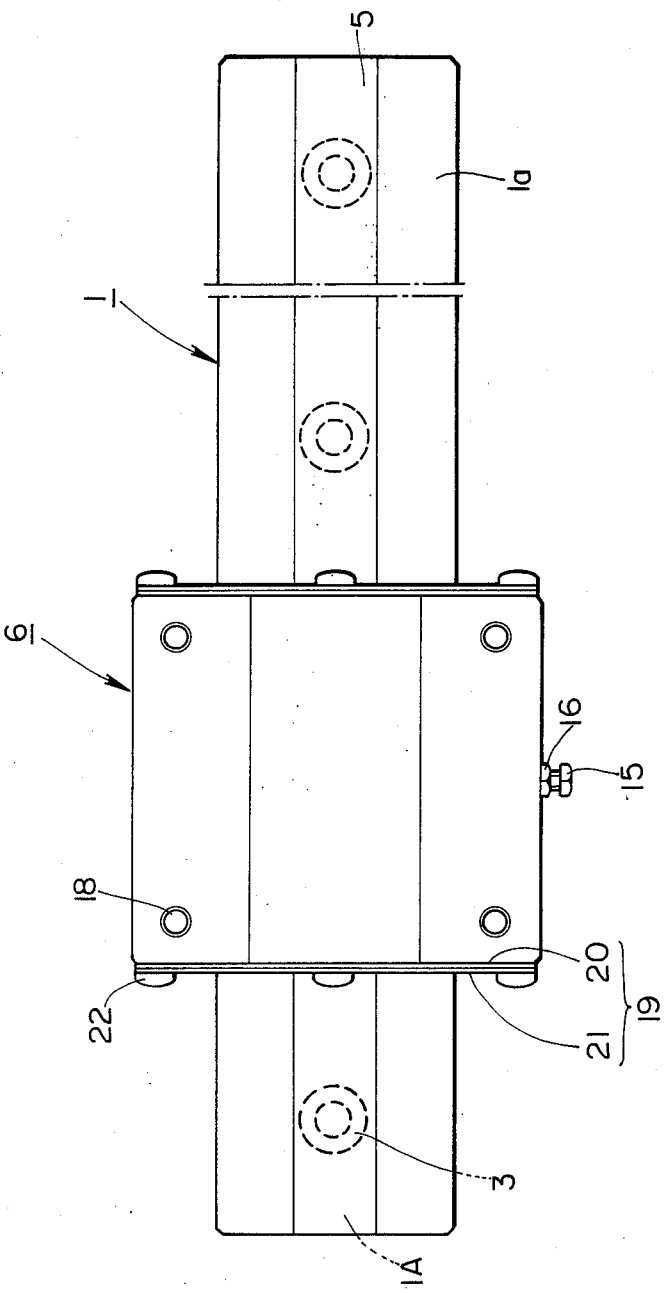
FIG. 3 is a plan view of the linear sliding guide bearing shown in FIG. 1.

An embodiment of the invention will be described with reference to FIGS. 1 to 3.

An axially extending guide rail 1 has a wide width, is relatively thin, and has a substantially inverted trapezoidal cross section. Specifically, the guide rail 1 has sliding side surfaces 1c which are divergently slanted upwardly and outwardly from a bottom surface 1b towards an upper surface 1a. The guide rail 1 is formed with a plurality of fixing bolt through bores 3 penetrating from the upper surface 1a to the bottom surface 1b at which the guide rail 1 is fixed to a base 2. The bores or holes 3 are arranged at predetermined intervals in the axial direction. Bolts 4 for fixing the guide rail 1 to the base 2 are inserted through the bolt through holes 3 and engage threaded holes formed in the base 2.

Furthermore, a shallow groove 1A having a wide width is formed in the upper surface 1a of the guide rail 1 and extends over the overall length of the guide rail 1. The upper surface 1a of the guide rail 1, excepting the groove 1A, forms a sliding surface.

After the guide rail 1 is secured to the base 2 by the bolts, a metal tape 5 having an adhesive coated on one surface is adhered on the groove 1A over the overall length of the groove 1A. If the opposite ends of the metal tape 5 are further fixed by tape clamps, the tape 5 will not be stripped away.

A slider 6 is loosely and slidably fitted on the guide rail 1. The slider 6 includes an upper plate portion 8 having an inner surface 8a facing the upper surface 1a of the guide rail 1 interposing a gap 7 therebetween, and side walls 9 extending downwardly from both side edges of the upper plate portion 8. Each of the side walls 9 has an inversely slanted inner surface 10 opposed to the slanted sliding side surface 1c of the guide rail 1 and interposing a gap therebetween.

A sliding member 11 made of a thin plastic plate is bonded to the inner surface 8a of the upper plate portion 8 and to the inversely slanted inner surface 10 of each side wall 9 to fill the gap between the slider 6 and the guide rail 1. The sliding member 11 is slidingly in contact with the upper surface and each side surface of the guide rail 1. In FIG. 1, the sliding member 11 in each side portion of the guide rail 1 is shown as being a sheet of bent plate, however, the sliding member 11 may be divided into two parts which are respectively located at the upper and side surfaces of the guide rail 1.

At least one of the side walls 9 of the slider 6 is formed with a slit 12 extending vertically from the bottom surface to reach near a base portion of the inverted slanted inner surface 10. The slit 12 also extends axially in parallel with the outer side surface of the side wall 9 over the overall length of the slider 6. A screw hole 14 is formed at an intermediate position of the overall length of the slider 6 penetrates the side wall 9 laterally from the outer side surface to reach a slit surface 13 of the slit 12. A pressing bolt 15 is engaged with the screw hole 14 to press the slit surface 13 and to elastically deform the inversely slanted inner surface 10 towards the sliding side surface 1c of the guide rail 1. A lock nut 16 is engaged with the pressing bolt 15. The slit 12 and the pressing bolt 15 constitute a gap adjusting means 17. A plurality of pressing bolts 15 may be used.

The guide rail 1 and slider 6 are manufactured by an extrusion molding method using an aluminum alloy material, and hard anodized aluminum treatment is employed.

Furthermore, a table fixing screw hole 18 is formed in the upper surface of the slider 6, and a wiper seal 19 having a synthetic rubber plate 20 secured to a clamping plate 21 is attached to each front and back end face of the slider 6 by a small fixing screw 22 engaged with a screw hole 23. The wiper seal 19 removes foreign particles deposited on the upper and side surfaces of the guide rail 1.

Next, the operation and effect of the invention will be described.

A plastic thin plate having a very small coefficient of friction is used for the sliding member. As a result, the linear slide guide bearing can be operated without lubrication, and it can be made small in size and light in weight as compared with the case where an oleo-sintered alloy is used.

In adjusting the gap, the lock nut 16 of the gap adjusting means 17 is loosened and the pressing bolt 15 is rotated. As a result, a pressing force applied to the slit surface 13 of the slit 12 is changed, and the degree of the elastic deformation of the side wall 9 of the slider 6 is altered. In this manner, a gap between the sliding member 11 and the sliding upper surface 1a and the sliding member 11 and the sliding upper surface 1a and the sliding side surface 1c of the guide rail 1 is adjusted. Thus, the fine adjustment of the gap can be achieved without removing the slider 6 from the guide rail 1.

Furthermore, the dust-proof property is improved by covering the fixing bolt holes 3 of the guide rail 1. Also, since the wiper seal 19 is not held by the edge of the bolt hole 3 while moving, the sliding movement can be performed smoothly.

Since the guide rail 1 and the slider 6 are made of an aluminum alloy treated with hard anodized aluminum, the weight is reduced to a great extent, the inertia of the moving part becomes small, and the wear-resistant property is improved.

As described in the foregoing, the following advantages are provided in the present invention.

The linear sliding guide bearing is made small in size and light in weight, and the gap adjustment is easy.

A dust-proof property and the smooth movement of the slider can be achieved.

The linear sliding guide bearing is improved in wear resistant property and service life.

What is claimed is:

1. A linear sliding guide bearing comprising:
   an axially extending guide rail including both sliding side surfaces slanting and expanding upwardly and outwardly from both edges of a bottom surface which is fixed to a base, said guide rail including a plurality of fixing bolt holes penetrating from an upper surface to the bottom and spaced at predetermined intervals along an axis line;

a slider loosely and slidably fitted onto said guide rail and including both side walls having inner surfaces slanting inversely and opposed to the slanting side surfaces of the guide rail with a gap therebetween, said slider including an upper plate portion having an inner surface opposed to the upper surface of said guide rail with a gap therebetween;

a sliding member formed of a thin plastic plate and bonded to the inner surface of the upper plate portion and to the inner surface of both the side walls to fill the gap therebetween;

at least one of the side walls being formed with a slit extending vertically from a bottom surface of the side wall to reach near an upper base portion of the inversely slanted inner surface, said slit also extending axially in parallel to the outer side surface of the side wall; and pressing means provided on said one of the side walls for pressing a slit surface of the slit to elastically deform the inversely slanted inner surface towards the sliding side surface of said guide rail.

2. The linear sliding guide bearing according to claim 1, further comprising a strip member bonded to the upper surface of said guide rail for covering the fixing bolt holes opening to the upper surface.

3. The linear sliding guide bearing according to claim 1, wherein said guide rail and said slider are made of an aluminum alloy treated with hard anodized aluminum.

* * * * *